United States Patent Office 3,209,395
Patented Oct. 5, 1965

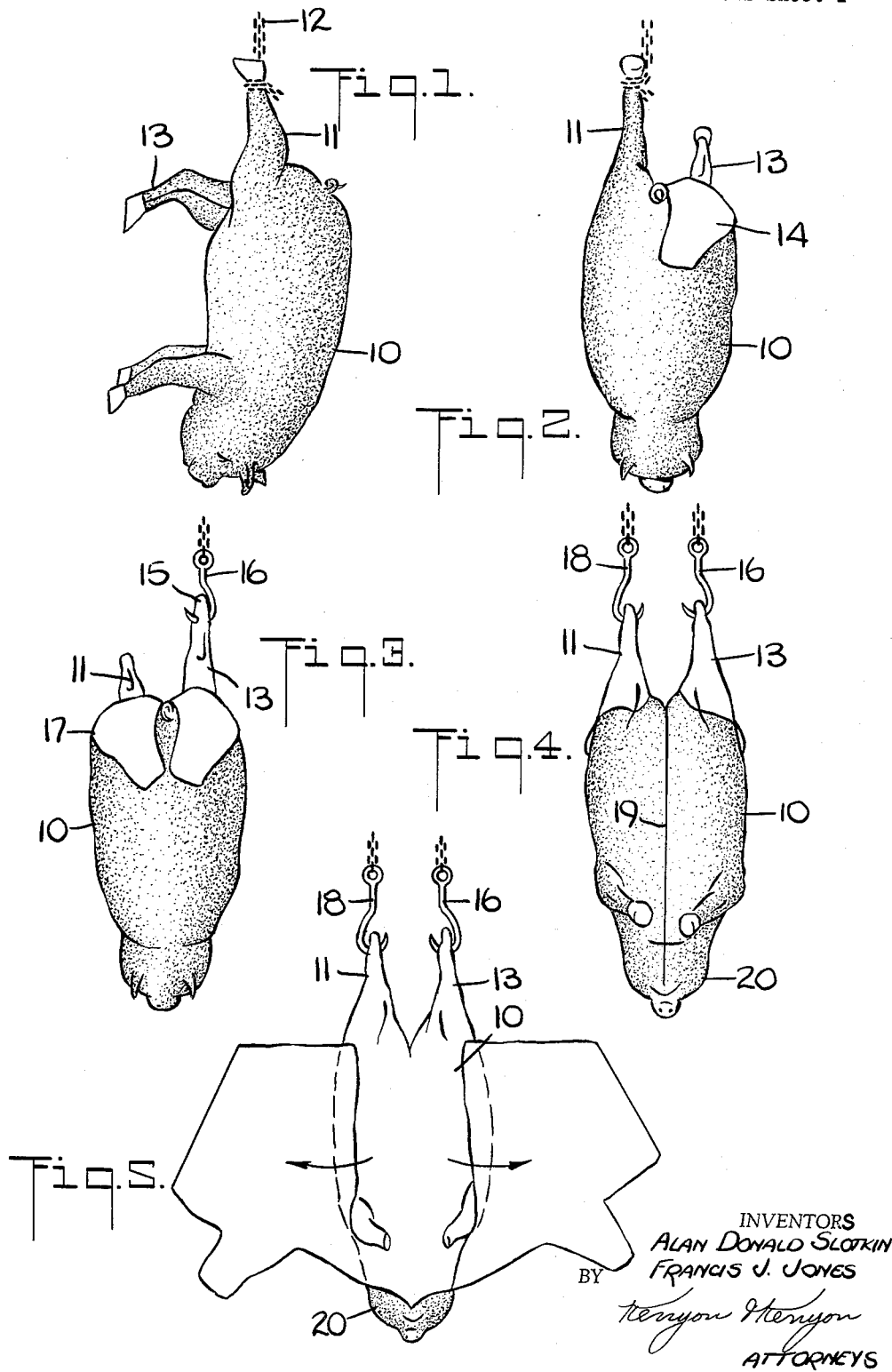

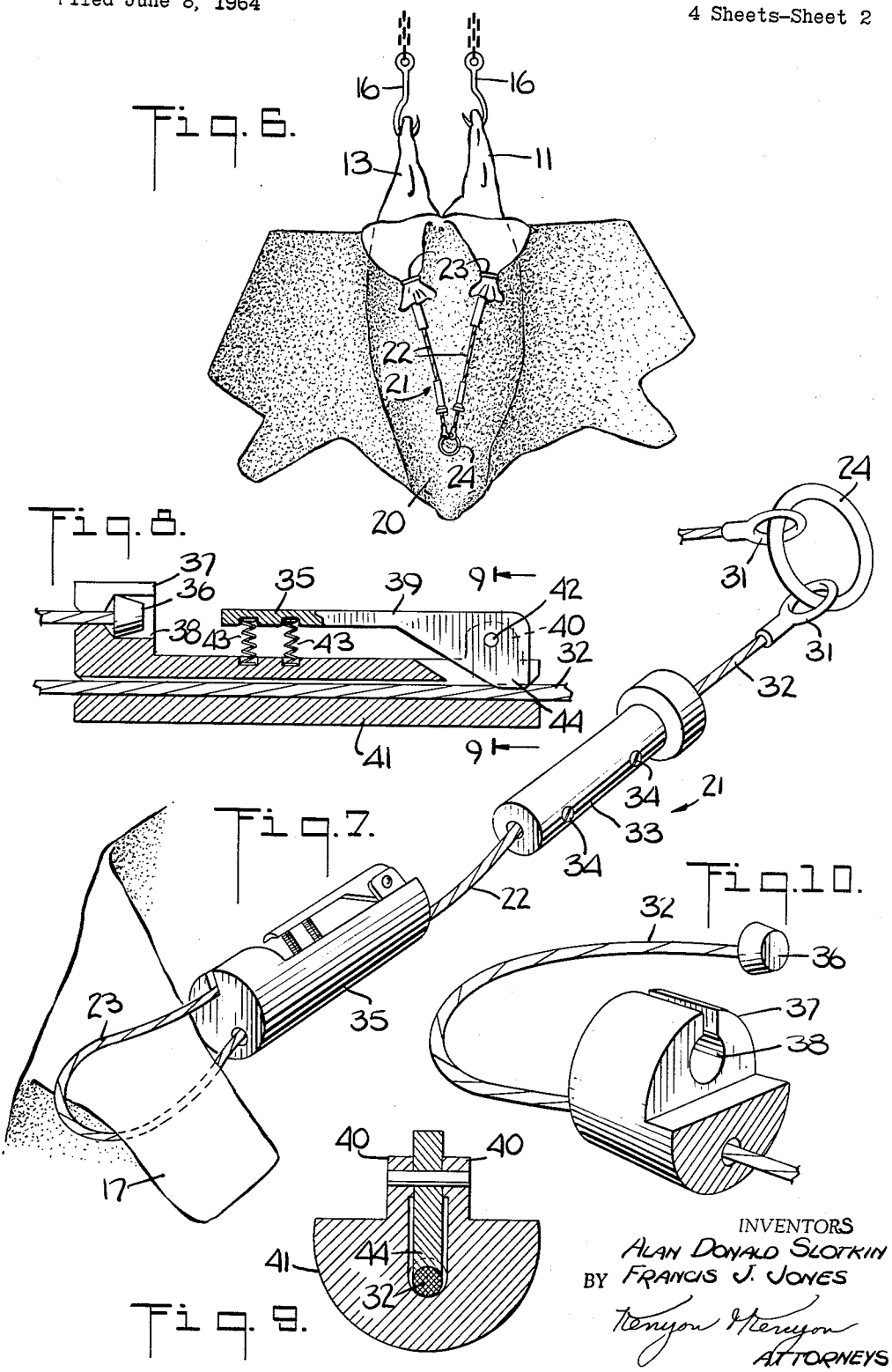

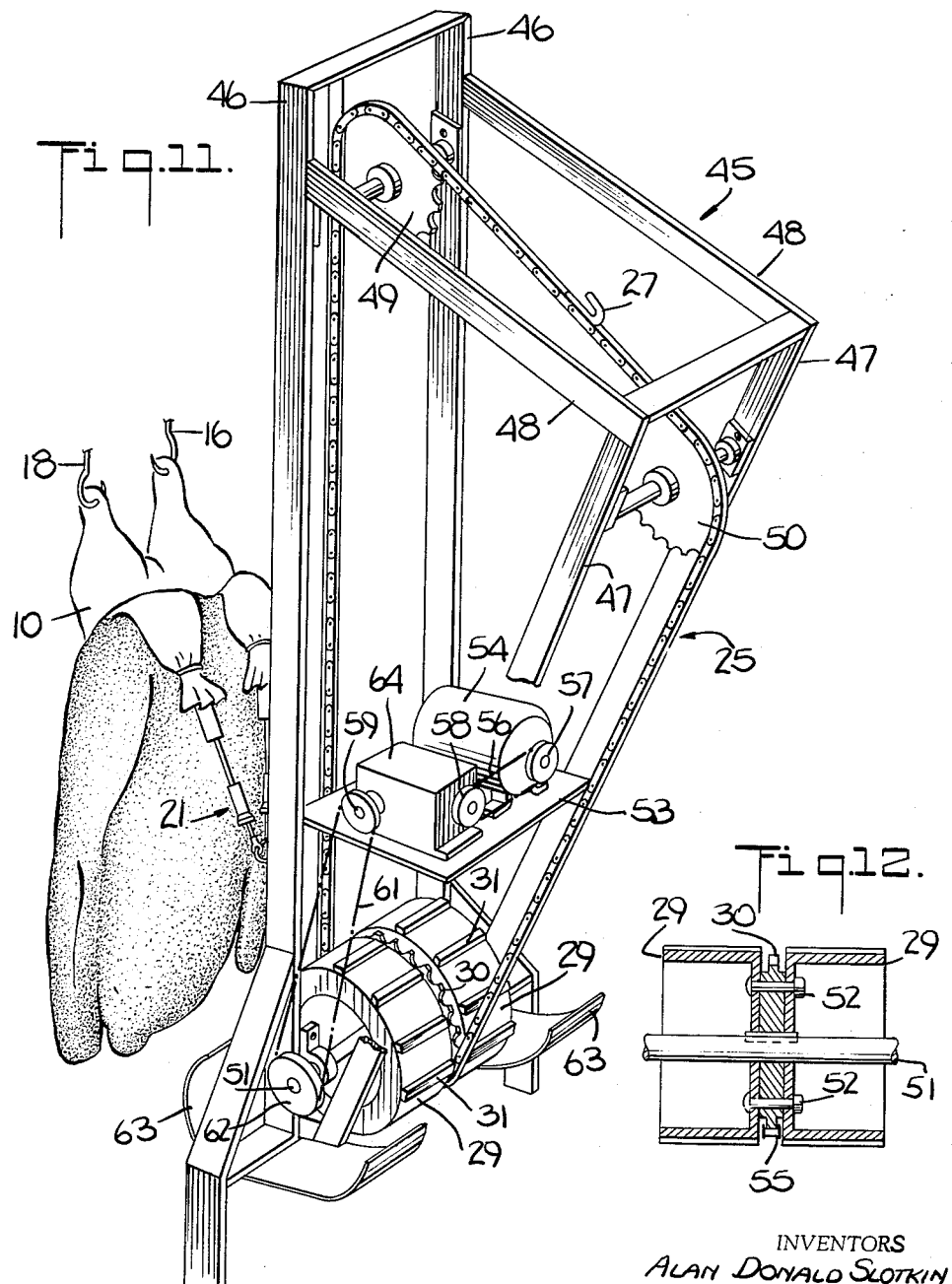

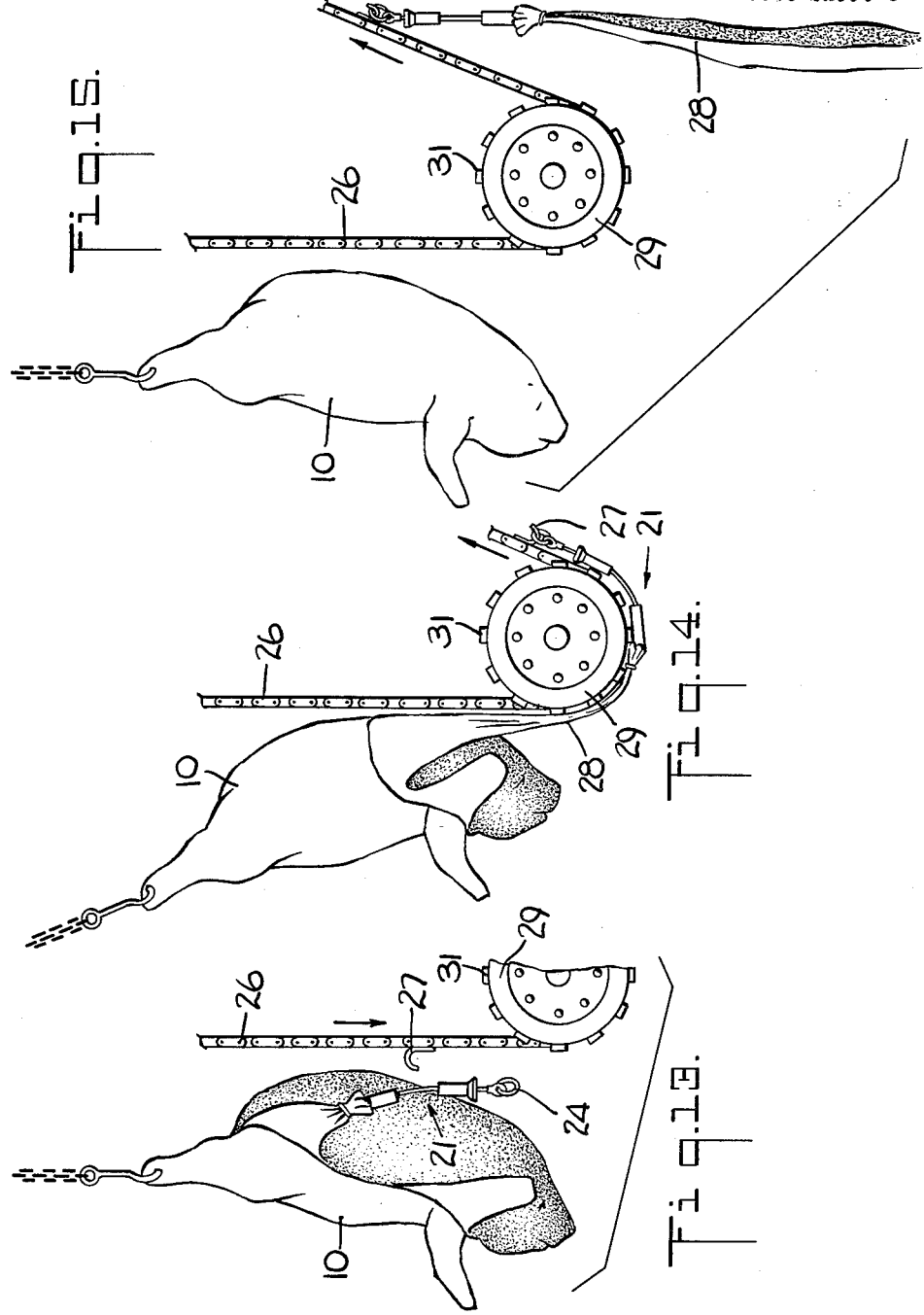

3,209,395
APPARATUS FOR SKIN REMOVAL FROM AN ANIMAL CARCASS
Francis J. Jones, Indianapolis, Ind., and Alan Donald Slotkin, Detroit, Mich., assignors to Hygrade Food Products Corporation, Detroit, Mich., a corporation of New York
Filed June 8, 1964, Ser. No. 373,441
7 Claims. (Cl. 17—21)

This invention relates to an apparatus for removing the skin from a hog carcass. The invention relates more particularly to such apparatus suitable for peeling the skin from a suspended hog carcass which is moving along a conveyor.

In the prior art accepted method of dressing hogs, the hog skin is not removed from a hog carcass as an entity. Rather, the hog after slaughtering is carried through a series of operations designed to remove the bristles and to thoroughly clean the outer skin surface of the hog carcass. These operations include scalding and singeing, followed by considerable use of manual labor to remove blemishes, hair and other foreign matter still remaining on the skin.

At this point in the prior art method, the carcass is split and chilled. Following the chilling step, the carcass is disassembled into a variety of cuts most of which are handled manually to remove all or a portion of the skin thereon.

The net result of the prior art method of hog dressing is that most of the hog skin is converted into small pieces most of which must be discarded, and, equally important, a substantial expenditure of manual labor is needed for removal of skin from the disassembled cuts. In addition, the scalding and singeing operations of the prior art method require considerable investment in plant space and equipment.

Unlike cattle or sheep, there is no fell immediately under the skin of a hog. The fell facilitates removal of the skin or hide, since it forms a natural separation between the skin and the meat of a carcass. In a hog, there is a thick layer of fat between the skin and the meat, and there is no natural interfacial boundary to aid in the skinning operation. Accordingly, a strong force in tension must be applied to a hog skin to strip it from the carcass.

Accordingly, it is an object of the present invention to provide an apparatus for removing substantially the entire skin from a hog carcass in one piece.

It is another object of the present invention to provide an apparatus suitable for removing the skin from a hog carcass by peeling the skin from a suspended carcass while it is moving along a conveyer.

It is a further object of this invention to provide a device which permits positive gripping of the skin during the skin peeling operation.

Briefly stated, one embodiment of the present invention is an apparatus for peeling the skin from an animal carcass comprising a support structure having a substantially vertical face with an elongated opening therein, an endless transmission band, a first turning axis for said band mounted adjacent the upper end of said vertical face, a second turning axis for said band mounted adjacent the lower end of said vertical face, said first and second turning axes being mounted so that the length of said band therebetween is in registry with said elongated opening in said face, drive means for positively moving said band about said turning axes in continuous travel, a split drum rotatably mounted coaxially with said second turning axis with the separation between the sections of the drum coincident with the path of the band, the peripheral surface of said split drum being adapted for frictional gripping, means for rotating said drum at a circumferential velocity equal to the linear velocity of said band, and skin gripping means adapted to positively grip the skin from said carcass, said skin gripping means also being adapted for reversibly locking onto said band.

The invention will be more readily understood when described in conjunction with the drawings, in which:

FIG. 1 is a perspective view of the side of a suspended hog carcass;

FIG. 2 is a perspective view of the back of the hog carcass showing removal of the skin from one of the hind legs to form a flap;

FIG. 3 is a perspective view showing removal of the skin from the other leg of the carcass to form a second flap;

FIG. 4 is a perspective view of the hog carcass showing an incision in the belly skin thereof;

FIG. 5 is a perspective view showing various portions of the skin after severing from the hog carcass;

FIG. 6 is a perspective view of the back of the hog carcass showing the attachment of one embodiment of a skin gripping means to the two flaps formed as shown in FIG. 3;

FIG. 7 is an enlarged perspective view of the skin gripping means;

FIG. 8 is an elevational view further enlarged, partly in section, showing the clamp portion of the skin gripping means of FIG. 7;

FIG. 9 is an end elevational view still further enlarged, in section, of the clamp of FIG. 8;

FIG. 10 is an enlarged perspective view, partly in section, of one end of the clamp of FIG. 8;

FIG. 11 is a perspective view of one embodiment if an apparatus in accordance with the present invention suitable for peeling the skin from a hog carcass;

FIG. 12 is a front elevational view, partly in section, of a part of the apparatus of FIG. 11;

FIG. 13 is a side elevational view of a part of the apparatus of FIG. 11 and the hog carcass as shown in FIG. 6;

FIG. 14 is a side elevational view showing the hog carcass during the skin peeling step; and FIG. 15 is a side elevational view showing the hog carcass with the skin completely removed.

With respect now more particularly to the drawings, FIG. 1 depicts a hog carcass 10 suspended from a hind leg 11. Attached to hind leg 11 is chain 12 which is connected to an overhead conveyer, not shown, which moves the carcass 10 at a selected rate of travel through the dressing area.

The first step in the preparation of carcass 10 prior to the use of the apparatus of the present invention involves cutting or severing the skin from the free hind leg 13 of the carcass 10 by use of manually operated knives or similar cutting devices. The skin is completely removed from the leg and flank area to form a flap 14 which is connected to the back skin of carcass 10 as shown in FIG. 2. The foot is then severed from skinned leg 13.

The weight of the hog carcass 10 is then shifted to the skinned leg 13 by inserting hook 16 at the ankle joint 15 as shown in FIG. 3. Hook 16 is attached to the aforementioned overhead conveyer, not shown. The other hind leg 11 is then skinned as described above to form flap 17, and the foot is then removed. A second hook 18 is inserted into leg 11 at the ankle joint so that carcass 10 is suspended from the overhead conveyer by both hind legs.

An incision 19 is made in the belly skin of carcass 10, extending from the crotch down to the throat, as shown in FIG. 4. Next, the skin is manually cut from the front legs and from the shoulder. The skin is removed from the jowls to facilitate peeling the skin over the head of carcass 10. The front feet are then removed from hog carcass 10. The belly skin on either side of incision 19 is severed from carcass 10 to form two vertically hinged panels of skin. The result of these manual cutting operations is shown in FIG. 5. Preferably, the tail is removed at this point of the skinning method.

As will be described below, the skin is stripped off the carcass including the head 20 by applying a force in tension. In order to accomplish the removal of the skin from the head 20 without unnecessary tearing, it is desirable to cut the ears and the eyebrow skin therefrom.

In order to peel the skin from the carcass, large forces are required. The apparatus of this invention is intended to furnish the necessary forces for such skin removal. In addition, the apparatus of the present invention embodies features which avoid distortion or tearing of the skin in a manner to be described below. FIGS. 6 through 12 depict one embodiment of the apparatus of the present invention.

Essentially, the embodiment comprises two separable devices which co-act to perform the desired operation. The first of these two devices is skin gripping means 21 which is used to provide positive gripping action on the skin. Skin gripping means 21 is depicted in FIG. 7. The second of the two devices is power means 25 which furnishes the mechanical force necessary to separate or peel the hide from the carcass.

Skin gripping means 21 comprises two members 22, as shown in FIG. 6, which are both connected to eye 24. For present purposes, it is sufficient to note that provision is made for tightening nooses 23 about skin flaps 14 and 17. As shown in FIG. 6, skin flaps 14 and 17 are firmly attached to skin gripping means 21.

FIG. 11 depicts power means 25 which includes an endless transmission band 26, specifically a chain, having hooks 27 attached thereto. Chain 26 is driven in a counterclockwise direction as viewed in FIG. 11. Sprockets 30, 49 and 50 serve as turning axes for chain 26. In addition, power for movement of chain 26 is supplied through sprocket 30, which serves as a drive sprocket.

FIG. 13 depicts hog carcass 10 in the form shown in FIG. 6 prior to the peeling step. In FIG. 13, chain 26 is moving in a downward direction. In order to peel the skin from carcass 10, eye 24 is engaged with hook 27. In this manner a tension force is applied between the carcass 10 and skin flaps 14 and 17 tending to peel the skin from the hog carcass 10.

FIG. 14 depicts carcass 10 at a time when approximately half of the skin 28 has been stripped or peeled from the carcass.

Referring to FIGS. 11 and 12, it can be seen that a split drum 29 is mounted co-axially with drive sprocket 30. The separation 55 between the two sections of split drum 29 is coincident with the path of chain 26. As described in detail below, drum 29 is driven and has a circumferential velocity at least equal to the linear velocity of chain 26. The peripheral surface of drum 29 is adapted to provide a high coefficient of sliding friction. In the embodiment shown, cleats 31 are attached to the peripheral surface of drum 29 and are oriented parallel to the axis of rotation thereof.

With reference now to FIG. 14, as chain 26 rotates, hook 27 moves around sprocket 30 in a counterclockwise direction and begins to travel in an upward direction. It can be seen from FIG. 14 that a portion of skin 28 is thereby biased against the cleats 31 of split drum 29, and the skin 28 in contact therewith is frictionally engaged. In this manner, drum 29 exerts a rotational force on the skin. Accordingly, due to this co-action between skin 28 and cleats 31, a substantial share of the tension force previously carried solely by hook 27 and eye 24, and consequently solely by skin flaps 14 and 17, is transferred to portions of removed skin 28 which are in frictional engagement with cleats 31. In other words, the force required to peel skin 28 from carcass 10 is borne in large measure by the portion of the skin 28 which is in frictional engagement with the cleats on split drum 29. Skin flaps 14 and 17 are subjected to that tension which is necessary to hold the skin 28 in frictional engagement with cleats 31, assuming no slippage between skin 28 and cleats 31.

As the peeling of skin 28 from carcass 10 progresses, successive increments of removed skin 28 move into frictional engagement with cleats 31 and thus are subjected to tension. Likewise, other portions of skin 28 move out of engagement with cleats 31, and thus the degree of tension to which they are subjected is decreased. In this manner, unnecessary stretching and distortion of the skin 28 is eliminated, since stress is transferred to successive increments of skin 28 as they are removed from carcass 10.

By driving drum 29 to produce a circumferential velocity at least equal to the linear velocity of chain 26, the advantages described above will be assured. It can be seen that if the circumferential velocity of drum 29 is less than the linear velocity of chain 26, the amount of distortion and possible tearing may even increase over that which would be present if drum 29 were not used at all.

Ideally, the circumferential velocity of drum 29 should be equal to the linear velocity of chain 26. This is accomplished in the embodiment shown in the drawings by making the effective diameter of drum 29 including cleats 31 equal to the effective diameter of drive sprocket 30. As shown in FIG. 12, power is transmitted to drum 29 by connecting it to sprocket 30 by means of bolts 52. Accordingly, drum 29 and sprocket 30 rotate as a single unit. However, such arrangement is not critical, and the advantages of having the circumferential velocity of drum 29 equal to the linear velocity of chain 26 may be achieved by driving drum 29 independently of sprocket 30.

FIG. 15 depicts the carcass 10 with the skin 28 completely removed therefrom including removal from the head.

With respect to skin gripping means 21 shown in FIG. 6, means 21 comprises two separate noose-forming members 22. Each member 22 comprises a ring 31 which is engaged with eye 24 as shown in FIG. 7. Attached to ring 31 is metal cable 32. Handle 33 is provided to facilitate the use of member 22, and is immovably connected to cable 32 by set screws 34, for example. As can be seen in FIG. 7, cable 32 passes through the center of handle 33.

Clamp means 35, shown partially in section in FIG. 8 is provided to form noose 23. Cable 23 passes through means 35 and the end of cable 32 is attached to a stop 36. As shown in FIGS. 8 and 10, stop 36 may be engaged with collar 37 by insertion into cavity 38, provided therein. In this manner, noose 23 is formed.

Clamp means 35 comprises dog 39 which is seated between bifurcated member 40 attached to base 41. Pin 42 is provided to permit pivotal movement of dog 39 with respect to base 41. Compression springs 43 are provided as shown in FIG. 8 to exert bias on dog 39, tending to pivot dog 39 in a clockwise direction.

As shown in FIG. 9, face 44 of dog 39 has a substantially concave cross section, thereby providing a mating fit with cable 32. Springs 43 cause face 44 of dog 39 to exert pressure on cable 32, thereby providing a gripping action which prevents cable 32 from loosely sliding within clamp means 35. With respect to FIG. 8, it can be seen that movement of cable 32 to the right will tend to lift face 44 of dog 39, thereby facilitating this movement of the cable. On the other hand, movement of cable 32 to the left will tend to pivot dog 39 in a clockwise direction, thereby increasing the clamping pressure of face 44 on cable 32.

In order to grip flap 17, as shown in FIG. 7, dog 39 is depressed against the bias of springs 43. This removes the clamping pressure otherwise exerted by face 44 and the cable 32 is permitted to slide within clamp means 35. Stop 36 is inserted in cavity 38 and noose 23 is made sufficiently large to permit insertion of flap 17. It has been found desirable to insert approximately an eight inch length of flap 17 through noose 23 to insure good gripping action. Once flap 17 is placed through noose 23, handle 33 is gripped in one hand and clamp means 35 is then moved along cable 32 to decrease the circumference of noose 23, thereby tightening the grip on skin flap 17. With reference to FIGS. 11 and 13, it can be seen that the application of tension resulting from engaging eye 24 with hook 27 tends to tighten noose 23 even further. Accordingly, during the skin peeling operation, there is no chance that flap 17 will be released from noose 23.

The apparatus depicted in FIG. 11 comprises a support structure 45 in the shape of an inverted A frame, having a pair of vertical legs 46, and a pair of legs 47 at an angle to the vertical. The frame is completed by a pair of base members 48 connecting legs 46 to legs 47. A rotatable sprocket 49 is located at the approximate juncture of base members 48 and legs 46 and a second rotatable sprocket 50 is located at the approximate juncture of base members 48 and legs 47.

A third sprocket, drive sprocket 30, is located at the approximate apex of support structure 45. Drive shaft 51 is connected to sprocket 30.

Endless chain 26 is engaged with sprockets 49, 50 and 30 as depicted in FIG. 11. The length of chain 26 between sprockets 30 and 49 is in registry with the opening in the vertical face formed by legs 46. Platform 53 is connected to legs 46 and 47 and supports drive means 54 which may, for example, be a 3 horsepower 1800 r.p.m. electric motor. Gear reducer 64 is connected to drive means 54, for example, by chain 56 and sprockets 57 and 58. The output shaft 59 of gear reducer 64 is connected to drive shaft 51 by means of sprocket 60, drive chain 61 and sprocket 62. The various sprockets and the reduction ratio of the gear reducer 64 are selected to impart a linear velocity to chain 26 of approximately 80 to 90 feet per minute.

As indicated above, hog carcass 10 is suspended from an overhead conveyor, not shown. In the interest of efficiency, it is desirable to perform all dressing operations on the carcass while it is moving along the conveyor. Accordingly, the apparatus shown in FIG. 11 has been designed to peel the skin 28 from carcass 10 while the carcass is moving. To this end skin shields 63 are provided on either side of split drum 29. Skin shields 63 are provided since it is expected that during the time lapse from the beginning of the peeling operation to the time at which the entire skin 28 has been removed from the hog, the carcass 10 will have moved laterally with respect to apparatus 25. Accordingly, the skin 28 will tend to move laterally with respect to split drum 29, and a portion of skin 28 may extend beyond the circumferential surface of split drum 29. In such event, one of skin shields 63 will function to prevent skin 28 from engaging with or being fouled in sprocket 62 or shaft 51.

Preferably, members 22 of skin gripping means 21 are approximately two feet in length. The carcass 10 is generally located approximately six inches from moving chain 26. Thus as shown in FIG. 13, skin gripping means 21 will be oriented in a substantially vertical direction immediately prior to engaging with hook 27. As chain 26 continues to rotate, the orientation of skin gripping means 21 develops a substantially downward peeling action on hide 28. In any event, it is necessary that the skin gripping means coact with power means 25 to produce a downward component in the force applied to the skin 28. Such orientation of the applied force is necessary in order to strip or peel the hide cleanly from the carcass and to prevent unnecessary tearing, ripping or other distortion of the skin.

It is necessary that the skin gripping means 21 be adapted for reversibly locking onto the endless chain 26. In the embodiment shown in the drawings, such reversible locking is accomplished by use of ring 24, on gripping means 21, which coacts with one of hooks 27 on chain 26. As shown in FIG. 11, chain 26 is provided with a plurality of hooks 27 which are welded or otherwise permanently attached to chain 26. After means 21 is attached to the skin by nooses 23, ring 24 is engaged with one of hooks 27 which is attached to a portion of chain 26 which is moving downward between sprocket 49 and sprocket 30. The direction of movement of chain 26 maintains ring 24 and hooks 27 in locked relationship because of the force required to peel skin 28 from carcass 10. Such locked relationship is maintained during the skinning operation.

In FIG. 15, skin 28 has been removed from carcass 10, and there is no force maintaining ring 24 and hook 27 in engagement other than the weight of skin 28. Accordingly, ring 24 may be simply and easily removed from engagement with hook 27. After separating skin 28 from gripping means 21, means 21 may be attached to the skin of another carcass being processed. This separation of the apparatus of the invention into two separable coacting parts facilitates and enhances the use of the apparatus for commercial production which requires efficiency and minimization of handling time. By using several skin gripping means 21 in the operation of one power means 25, a steady throughput is assured.

An important advantage of the apparatus for skin removal depicted in the drawings and described above is that the skin is always being moved in a direction away from the carcass as it is peeled from the carcass. Thus, when the skin is finally completely removed from the carcass, there is no possibility that the contaminated outer portions of the skin can come in contact with the carcass.

What has been described above is an apparatus for removing the skin from a hog carcass in substantially one piece. The inventive apparatus permits the transfer of at least a part of the force necessary to peel the skin from the carcass. It is to be understood that variations may be made in the described apparatus by one skilled in the art without departing from the spirit and the scope of the invention.

What is claimed is:

1. An apparatus for peeling the skin from an animal carcass comprising a support structure having a substantially vertical face with an elongated opening therein, an endless transmission band, a first turning axis for said band mounted adjacent the upper end of said vertical face, a second turning axis for said band mounted adjacent the lower end of said vertical face, said first and second turning axes being mounted so that the length of said band therebetween is in registry with said elongated opening in said face, drive means for positively moving said band about said turning axes in continuous travel, a split drum rotatably mounted coaxially with said second turning axis with the separation between the sections of the drum coincident with the path of the band, the peripheral surface of said split drum being adapted for frictional gripping, means for rotating said drum at a circumferential velocity approximately equal to the linear velocity of said band, and skin gripping means for positively gripping the skin from said carcass, said skin gripping means being adapted for reversibly locking onto said band.

2. An apparatus for peeling the skin from an animal carcass comprising a support structure having a substantially vertical face with an elongated opening therein, an endless transmission band, a first turning axis for said band mounted adjacent the upper end of said vertical face, a second turning axis for said band mounted adjacent the lower end of said vertical face, said first and second turning axes being mounted so that the length of said band therebetween is in registry with said elongated opening in said face, drive means for positively moving said band about said turning axes in continuous travel, a split drum rotatably mounted coaxially with said second turning axis with the separation between the sections of the drum coincident with the path of the band, the peripheral surface of said split drum being adapted for frictional gripping, skin shield means mounted adjacent each of the two outer faces of said drum, means for rotating said drum at a circumferential velocity approximately equal to the linear velocity of said band, and skin gripping means for positively gripping the skin from said carcass, said skin gripping means being adapted for reversibly locking onto said band.

3. Apparatus for peeling the skin from an animal carcass comprising a support structure with an elongated vertical face having an opening therein, a first chain sprocket mounted adjacent the upper terminus of said face, a second chain sprocket mounted adjacent the lower terminus of said face, an endless chain having a defined path of travel which includes the linear path between said sprockets, said first and second sprockets being oriented so that the length of chain therebetween is in registry with said opening in said face, drive means to continuously move said chain in said path and around said sprockets, a split drum mounted coaxially with said second sprocket and disposed so that the separation between the two sections thereof is coincident with the path of travel of said chain, the peripheral surface of said drum being adapted to provide a high coefficient of sliding friction, means to positively rotate said split drum to provide a circumferential velocity approximately equal to the linear velocity of said chain, and skin gripping means for positively gripping the skin from said carcass, said skin gripping means being adapted for reversibly locking onto said chain.

4. The apparatus of claim 3 in which said second sprocket is a drive sprocket, said drive means is connected to said second sprocket, said split drum is connected to said second sprocket, and the effective diameter of said drum is approximately equal to the effective diameter of said second sprocket.

5. Apparatus for peeling the skin from an animal carcass comprising a support structure with an elongated vertical face having a vertically extending opening therein, a first chain sprocket mounted adjacent the upper terminus of said face, a second chain sprocket mounted adjacent the lower terminus of said face, an endless chain having a defined path of travel which includes a linear path between said sprockets, said first and second sprockets being oriented so that the length of chain therebetween is in registry with said opening in said face, a plurality of first locking means connected to said chain at spaced intervals, drive means connected to said second sprocket whereby said second sprocket continuously moves said chain in said path and around said sprockets, a split drum connected to said second sprocket and mounted coaxially therewith, said second sprocket being located between the two sections of said split drum, said split drum having a peripheral surface adapted for frictional gripping and having an effective diameter approximately equal to the effective diameter of said second sprocket, and skin gripping means for positively gripping the skin from said carcass, said skin gripping means comprising second locking means coacting with said first locking means to reversibly lock said skin gripping means to said chain.

6. A power means for use in conjunction with a skin gripping means which is reversibly lockable thereto for peeling the skin from an animal carcass, comprising a support structure having a substantially vertical face with an elongated opening therein, an endless transmission band, a first turning axis for said band mounted adjacent the upper end of said vertical face, a second turning axis for said band mounted adjacent the lower end of said vertical face, said first and said second turning axes being mounted so that the length of said band therebetween is in registry with said elongated opening in said face, drive means for positively moving said band about said turning axes in continuous travel, a split drum rotatably mounted coaxially with said second turning axis with the separation between the sections of the drum coincident with the path of the said band, the peripheral surface of said split drum being adapted for frictional gripping, means for rotating said drum at a circumferential velocity approximately equal to the linear velocity of said band, said endless transmission band being adapted to provide reversible locking of said skin gripping means thereto.

7. Apparatus for peeling the skin from an animal carcass comprising a support structure in the shape of an inverted A frame having two legs, said frame being disposed so that one of the said legs is substantially vertical, said vertical leg having an elongated vertical opening therein, a first chain sprocket mounted in said frame adjacent the upper end of said vertical leg, a second chain sprocket mounted in said frame adjacent the lower end of said vertical leg, a third chain sprocket mounted in said frame adjacent the upper end of the other leg of said A frame, an endless chain having a defined path of travel around said three sprockets including a linear path of travel between said first and said second sprockets, said first and said second sprockets being oriented so that the length of chain therebetween is in registry with said opening, a plurality of first locking means connected to said chain at spaced intervals, drive means connected to said second sprocket whereby said second sprocket continuously moves said chain in said path, a split drum connected to said second sprocket and mounted coaxially therewith, said second sprocket being located between the two sections of said split drum, said split drum having a peripheral surface adapted for frictional gripping and having an effective diameter approximately equal to the effective diameter of said second sprocket, and skin gripping means comprising a cable and noose-forming means associated therewith for forming a noose from said cable, said noose being employed for positively gripping the skin from said carcass, said skin gripping means comprising second locking means connected to said cable coacting with said first locking means to reversibly lock said skin gripping means to said chain.

References Cited by the Examiner
UNITED STATES PATENTS

| 121,974 | 12/71 | Turnbull | 24—134 |
| 1,475,256 | 11/23 | Belair. | |
| 2,053,018 | 9/36 | Bell | 24—134 |
| 2,829,412 | 4/58 | Melton | 24—134 |
| 3,129,454 | 4/64 | Johnson | 17—21 |

SAMUEL KOREN, *Primary Examiner.*

LUCIE H. LAUDENSLAGER, *Examiner.*